US008755807B2

(12) United States Patent
Gorokhov et al.

(10) Patent No.: US 8,755,807 B2
(45) Date of Patent: Jun. 17, 2014

(54) SEMI-STATIC RESOURCE ALLOCATION TO SUPPORT COORDINATED MULTIPOINT (COMP) TRANSMISSION IN A WIRELESS COMMUNICATION NETWORK

(75) Inventors: Alexei Y. Gorokhov, San Diego, CA (US); Ravi Palanki, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 756 days.

(21) Appl. No.: 12/652,923

(22) Filed: Jan. 6, 2010

(65) Prior Publication Data

US 2010/0177746 A1 Jul. 15, 2010

Related U.S. Application Data

(60) Provisional application No. 61/144,086, filed on Jan. 12, 2009, provisional application No. 61/147,995, filed on Jan. 28, 2009.

(51) Int. Cl.
*H04W 72/00* (2009.01)
*H04W 4/00* (2009.01)

(52) U.S. Cl.
USPC .......................................... 455/450; 370/329

(58) Field of Classification Search
USPC ........... 370/329–334; 455/450–453, 436–444
See application file for complete search history.

(56) References Cited

U.S. PATENT DOCUMENTS 5,267,261 A * 11/1993 Blakeney et al. ............ 370/332
6,335,922 B1 * 1/2002 Tiedemann et al. .......... 370/335
7,321,780 B2 * 1/2008 Love et al. ................... 455/522
8,081,978 B2 * 12/2011 Pecen et al. ............... 455/435.2
2003/0139186 A1 * 7/2003 Igarashi et al. .............. 455/438
2005/0047492 A1 * 3/2005 Amerga et al. .............. 375/150
2011/0038275 A1 * 2/2011 Kim et al. .................... 370/252
2011/0103292 A1 * 5/2011 Pasad et al. .................. 370/315

FOREIGN PATENT DOCUMENTS

WO  WO 2010081166 A2 * 7/2010 ............... H04L 5/00

OTHER PUBLICATIONS

International Search Report and Written Opinion—PCT/US2010/020804, International Search Authority—European Patent Office—Oct. 21, 2010.
Qualcomm Europe: "Coordinated Multi-Point downlink transmission i n LTE-Advanced," 3GPP Draft; R1-084400, 3rd Generation Partnership Project (3GPP), Prague, Czech Republic; (Nov. 15, 2008), XP050317663.

(Continued)

*Primary Examiner* — Thai Hoang
(74) *Attorney, Agent, or Firm* — Florin Corie

(57) ABSTRACT

Techniques for supporting Coordinated MultiPoint (CoMP) transmission are described. For CoMP transmission, multiple cells may simultaneously send one or more data streams to one or more UEs on the same time-frequency resources based on short-term channel feedback from at least one UE to at least two cells. In an aspect, a semi-static configuration may be used by a set of cells for CoMP transmission to a UE. The semi-static configuration may indicate resource elements available to the set of cells to send CoMP transmission to the UE. The available resource elements may be determined based on a maximum number of TDM control symbols for all cells in the set and resource elements used for cell-specific reference signals by the cells in the set. A cell in the set may send data on the available resource elements to the UE for the CoMP transmission.

32 Claims, 10 Drawing Sheets

(56) References Cited

OTHER PUBLICATIONS

ZTE: "Resource Mapping Issues on JP transmission in CoMP," 3GPP Draft; R1-090070, 3rd Generation Partnership Project (3GPP), Ljubljana, Slovenia, (Jan. 12, 2009), XP050318014.

Parkvall S et al., "LTE-Advanced—Evolving LTE towards IMT-Advanced", Vehicular Technology Conference, 2008, VTC 2008-Fall, IEEE 68th, IEEE, Piscataway, NJ, USA, Sep. 21, 2008, pp. 1-5, XP031352496, ISBN: 978-1-4244-1721-6.

Swahashi M., "Radio Access Techniques for LTE-Advanced," Musashi Institute of Technology/ NTT Docomo, Inc, Aug. 20, 2008.

Huawei: "Inter-eNB and Intra-eNB Schemes for CoMP in LTE-Advanced", 3GPP Draft TSG RAN WG#54; R1-083050, 3rd Generation Partnership Project (3GPP), Jeju, Korea, (Aug. 18-22, 2008).

Mitsubishi Electric: "Use case of OI/HII indicators for uplink ICIC", 3GPP TSG-RAN WG1 #53, R1-081910, May 9, 2008.

Texas Instruments, "Aspects of Coordinated Multi-point Transmission for Advanced E-UTRA", 3GPP TSG-RAN WG1 #55, R1-084444, Nov. 15, 2008.

* cited by examiner

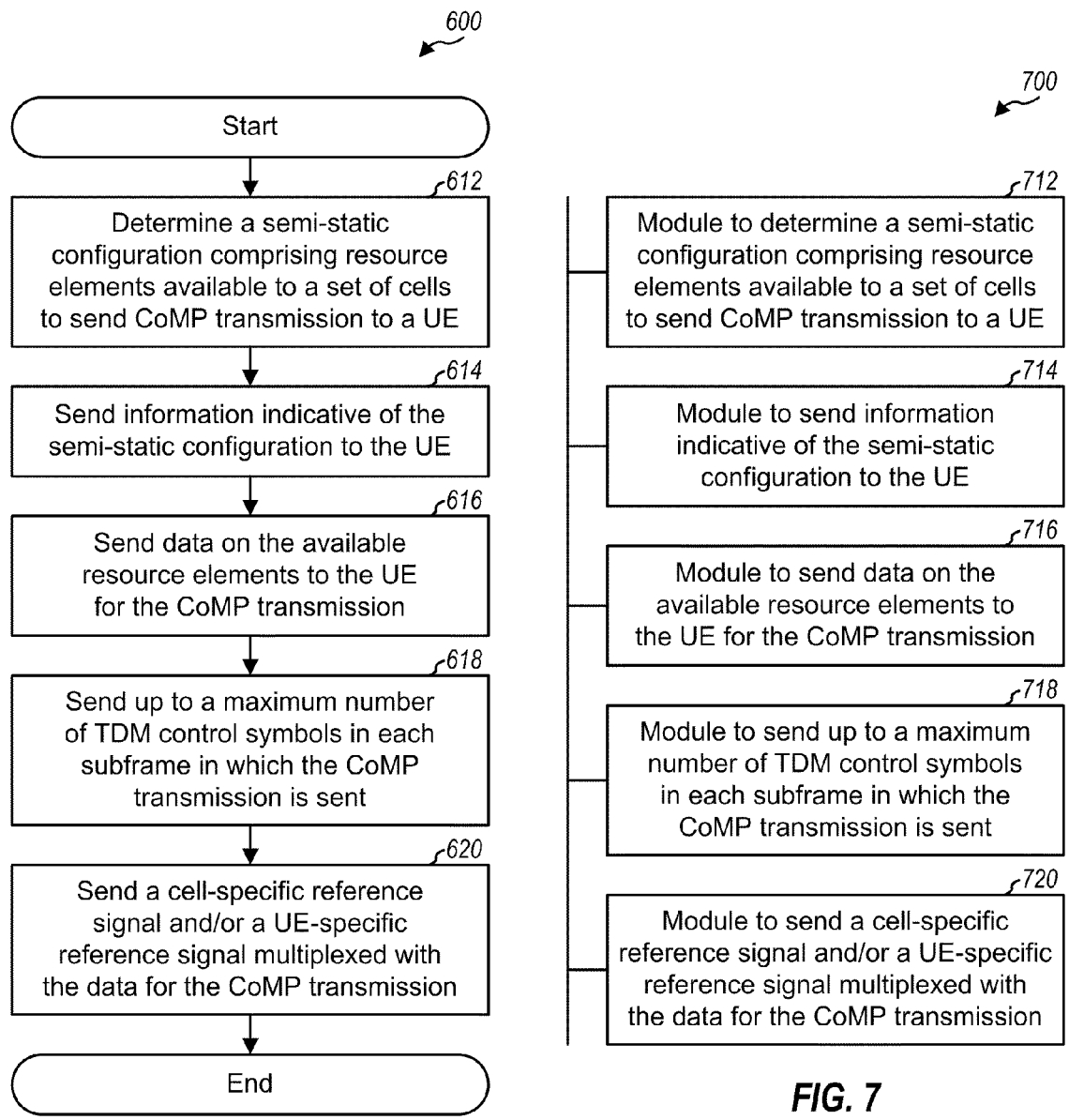

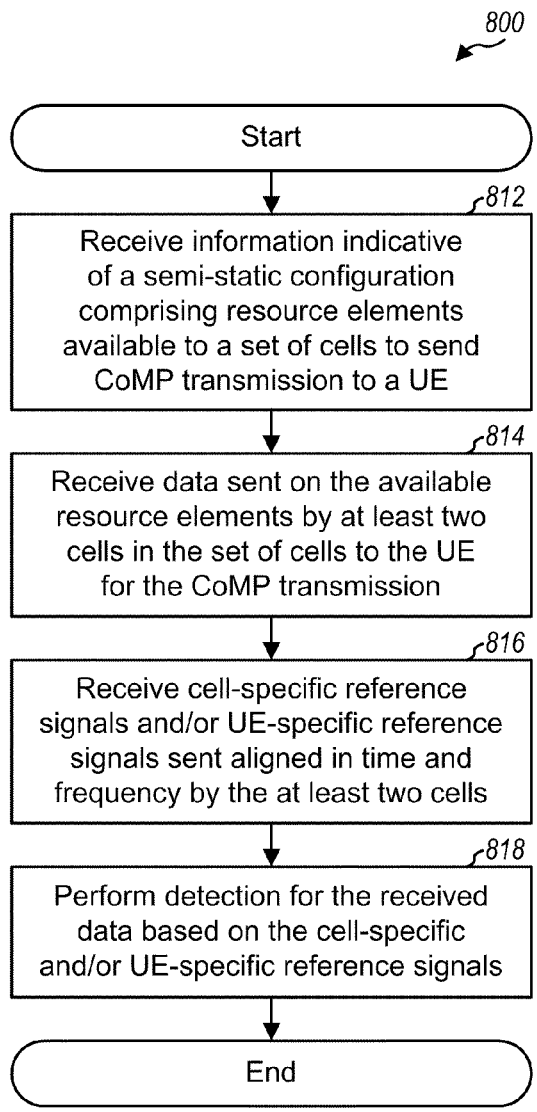
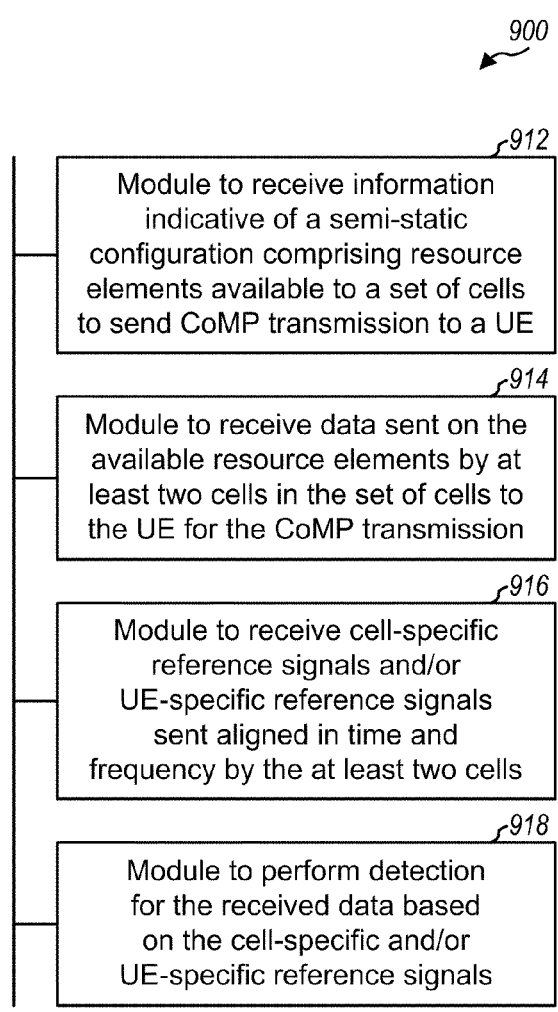
FIG. 8
FIG. 9

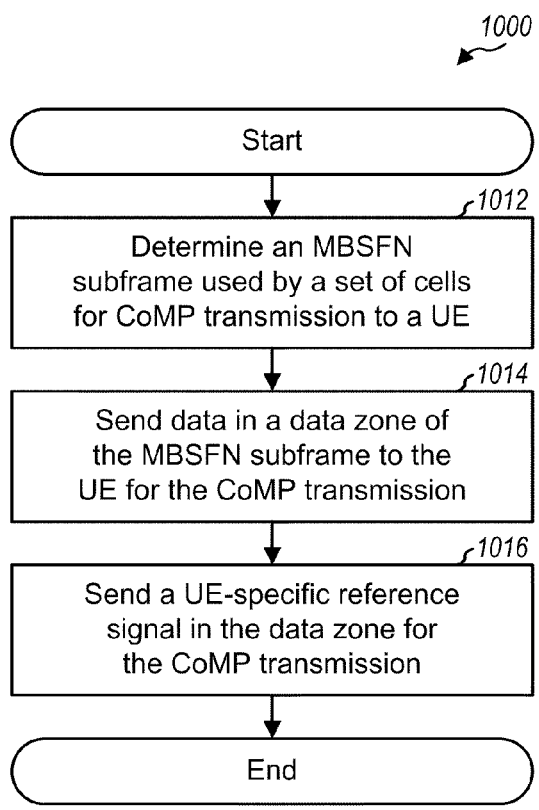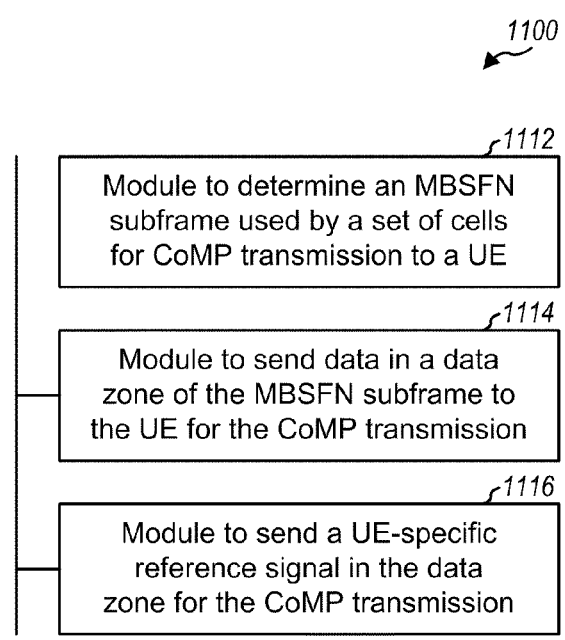
FIG. 10
FIG. 11

SEMI-STATIC RESOURCE ALLOCATION TO SUPPORT COORDINATED MULTIPOINT (COMP) TRANSMISSION IN A WIRELESS COMMUNICATION NETWORK

The present application claims priority to provisional U.S. Application Ser. No. 61/144,086, entitled "Methods and Systems to Enable Resource Allocation to Support Coordinated MultiPoint (CoMP) Techniques in LTE-Advanced," filed Jan. 12, 2009, and provisional U.S. Application Ser. No. 61/147,995, entitled "Methods and Systems to Enable Resource Allocation to Support Coordinated MultiPoint (CoMP) Techniques in LTE-Advanced," filed Jan. 28, 2009, both assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of these multiple cells may be selected to serve the UE. It may be desirable for the selected cell(s) to send data to the UE as efficiently as possible to achieve good performance.

SUMMARY

Techniques for supporting Coordinated MultiPoint (CoMP) transmission are described herein. For CoMP transmission, multiple cells may simultaneously send one or more data streams to one or more UEs on the same time-frequency resources based on short-term channel feedback from at least one UE to at least two cells. CoMP transmission may improve throughput and provide other advantages. In an aspect, a semi-static configuration may be used by a set of cells for CoMP transmission to a UE. The semi-static configuration may comprise resource elements (or time-frequency resources) that are available to all cells in the set to send data to the UE. The semi-static configuration may change infrequently, if at all, and may thus reduce overhead and complexity for CoMP transmission.

In one design, a cell may determine a semi-static configuration comprising resource elements available to a set of cells to send CoMP transmission to a UE. The available resource elements may be determined based on (i) a maximum number of time division multiplexed (TDM) control symbols for all cells in the set, (ii) resource elements used for cell-specific reference signals by the cells in the set, and/or (iii) other information. The semi-static configuration may be valid for a plurality of subframes in which the CoMP transmission is sent. The cell may send information indicative of the semi-static configuration to the UE. The cell may send data on the available resource elements (e.g., in a regular subframe, or a multicast/broadcast single frequency network (MBSFN) subframe, or a blank subframe) to the UE for the CoMP transmission. The cell may also send up to the maximum number of TDM control symbols in each subframe in which the CoMP transmission is sent. The cell may send a cell-specific reference signal and/or a UE-specific reference signal multiplexed with the data. The cells in the set may transmit their cell-specific and/or UE-specific reference signals aligned in time and frequency on a single set of resource elements in order to reduce overhead.

In one design, the UE may receive the information indicative of the semi-static configuration. The UE may also receive the data sent on the available resource elements by some or all of the cells in the set to the UE for the CoMP transmission. The UE may receive cell-specific and/or UE-specific reference signals sent by the cells. The UE may perform detection for the received data based on the cell-specific and/or UE-specific reference signals.

Various aspects and features of the disclosure are described in further detail below.

BRIEF DESCRIPTION OF THE DRAWINGS

FIGS. 6 and 7 show a process and an apparatus, respectively, for sending CoMP transmission with a semi-static configuration.
FIGS. 8 and 9 show a process and an apparatus, respectively, for receiving CoMP transmission with a semi-static configuration.
FIGS. 10 and 11 show a process and an apparatus, respectively, for sending CoMP transmission in an MBSFN subframe.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC- FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
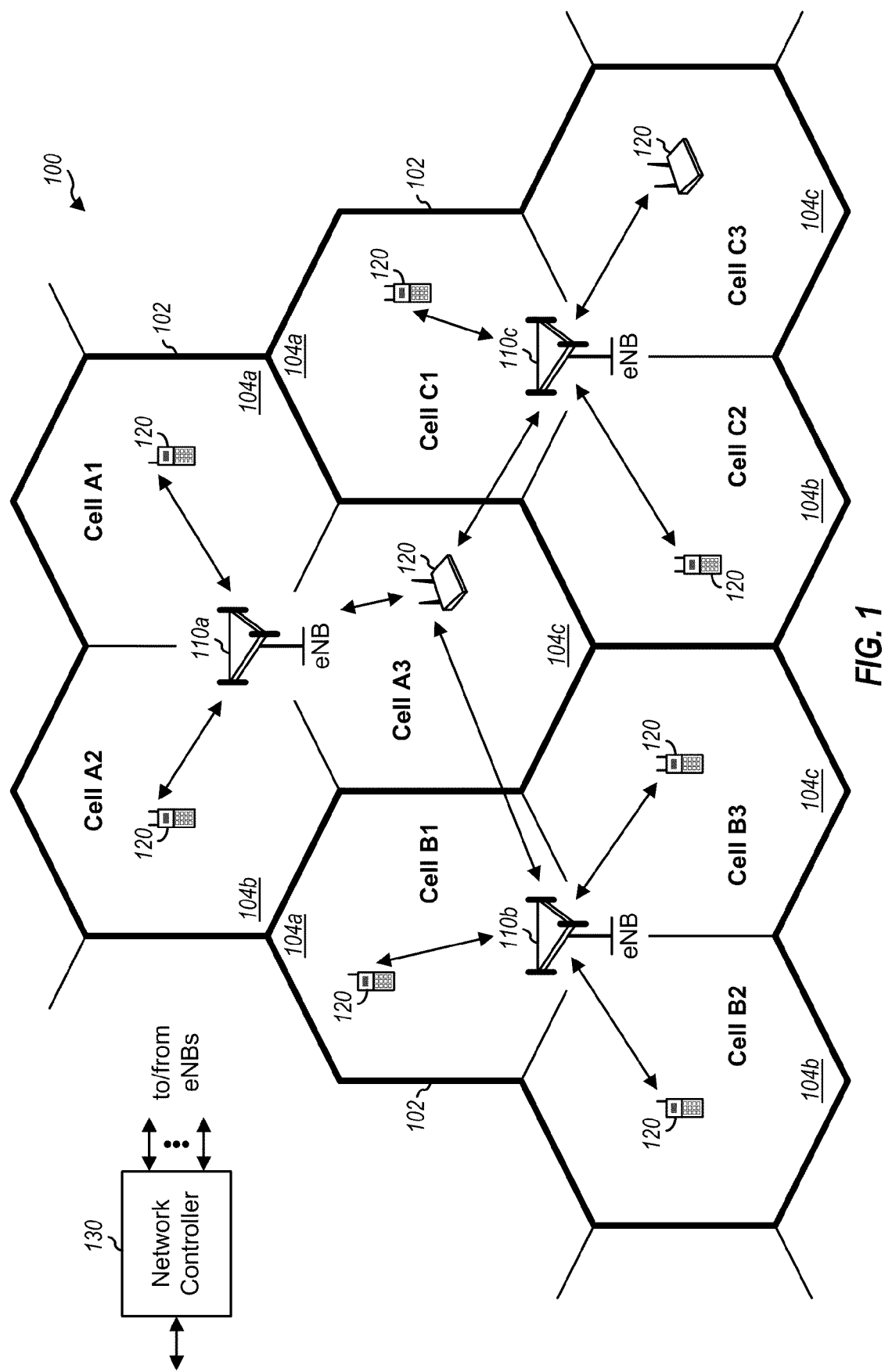
FIG. 1 shows a wireless communication network.

FIG. 1 shows a wireless communication network 100, which may be an LTE network or some other wireless network. Network 100 may include a number of evolved Node Bs (eNBs) and other network entities that can support communication for a number of UEs. For simplicity, only three eNBs 110a, 110b and 110c and one network controller 130 are shown in FIG. 1. An eNB may be a station that communicates with the UEs and may also be referred to as a base station, a Node B, an access point, etc. Each eNB 110 may provide communication coverage for a particular geographic area 102. To improve system capacity, the overall coverage area of an eNB may be partitioned into multiple smaller areas, e.g., three smaller areas 104a, 104b and 104c. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells.

Network controller 130 may couple to a set of eNBs and may provide coordination and control for these eNBs. Network controller 130 may comprise a Mobile Management Entity (MME) and/or some other network entity.

A number of UEs may be dispersed throughout the wireless network, and each UE may be stationary or mobile. For simplicity, FIG. 1 shows only one UE 120 in each cell. A UE may also be referred to as a terminal, a mobile station, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a base station/cell via the downlink and uplink. The downlink (or forward link) refers to the communication link from the base station/cell to the UE, and the uplink (or reverse link) refers to the communication link from the UE to the base station/cell.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

Figure 2:
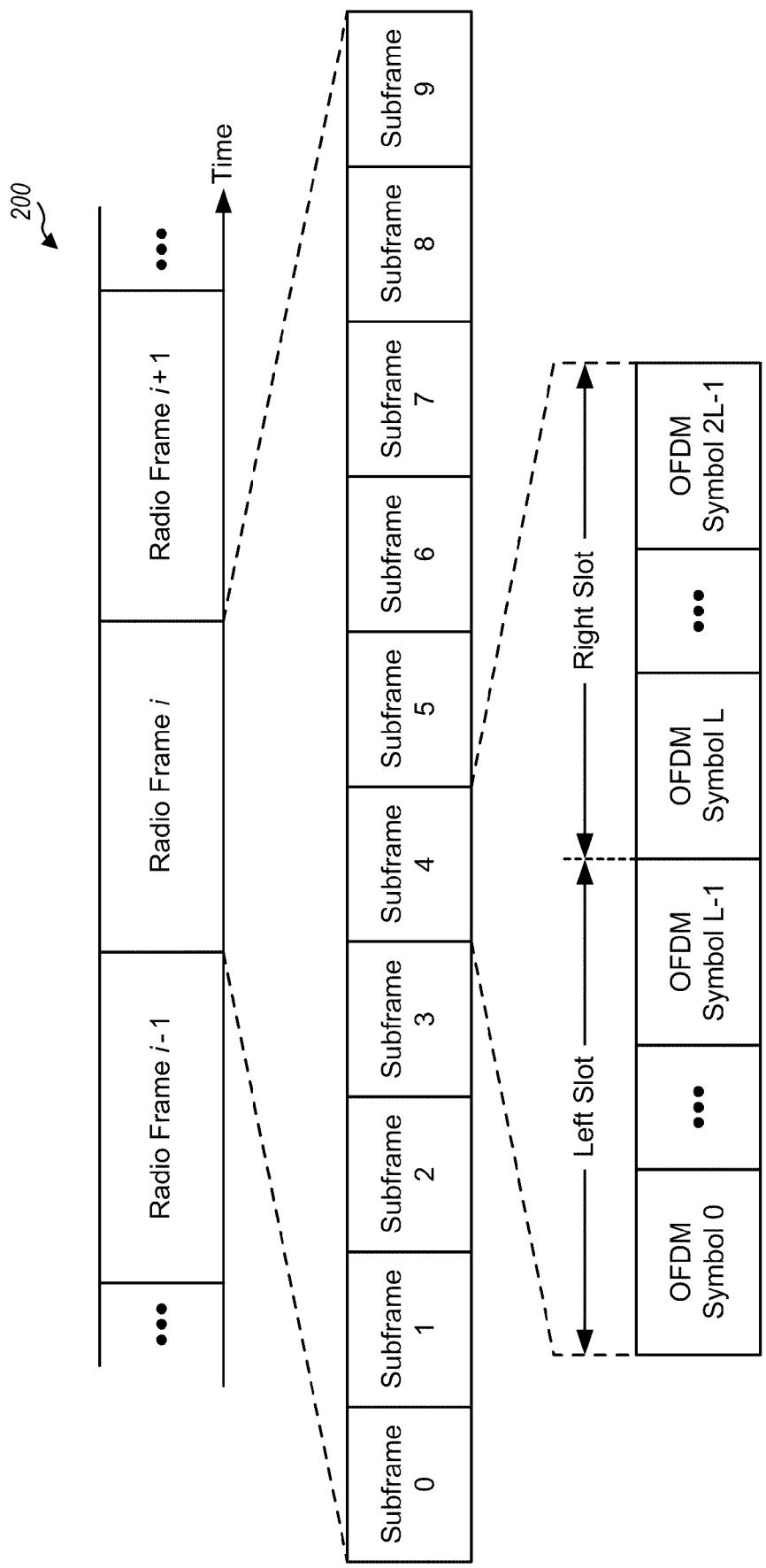
FIG. 2 shows an exemplary frame structure.

FIG. 2 shows a frame structure 200 used in LTE. The transmission timeline for the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots, and each slot may include L symbol periods, e.g., seven symbol periods for a normal cyclic prefix or six symbol periods for an extended cyclic prefix. The 2L symbol periods in each subframe may be assigned indices of 0 through 2L-1. On the downlink, an OFDM symbol may be sent in each symbol period of a subframe, as shown in FIG. 2. On the uplink, an SC-FDMA symbol may be sent in each symbol period of a subframe.

LTE supports transmission of unicast data to specific UEs. LTE also supports transmission of broadcast data to all UEs and multicast data to groups of UEs. A multicast/broadcast transmission may also be referred to as an MBSFN transmission. A subframe used for sending unicast data may be referred to as a regular subframe. A subframe used for sending multicast and/or broadcast data may be referred to as an MBSFN subframe.

Figure 3:
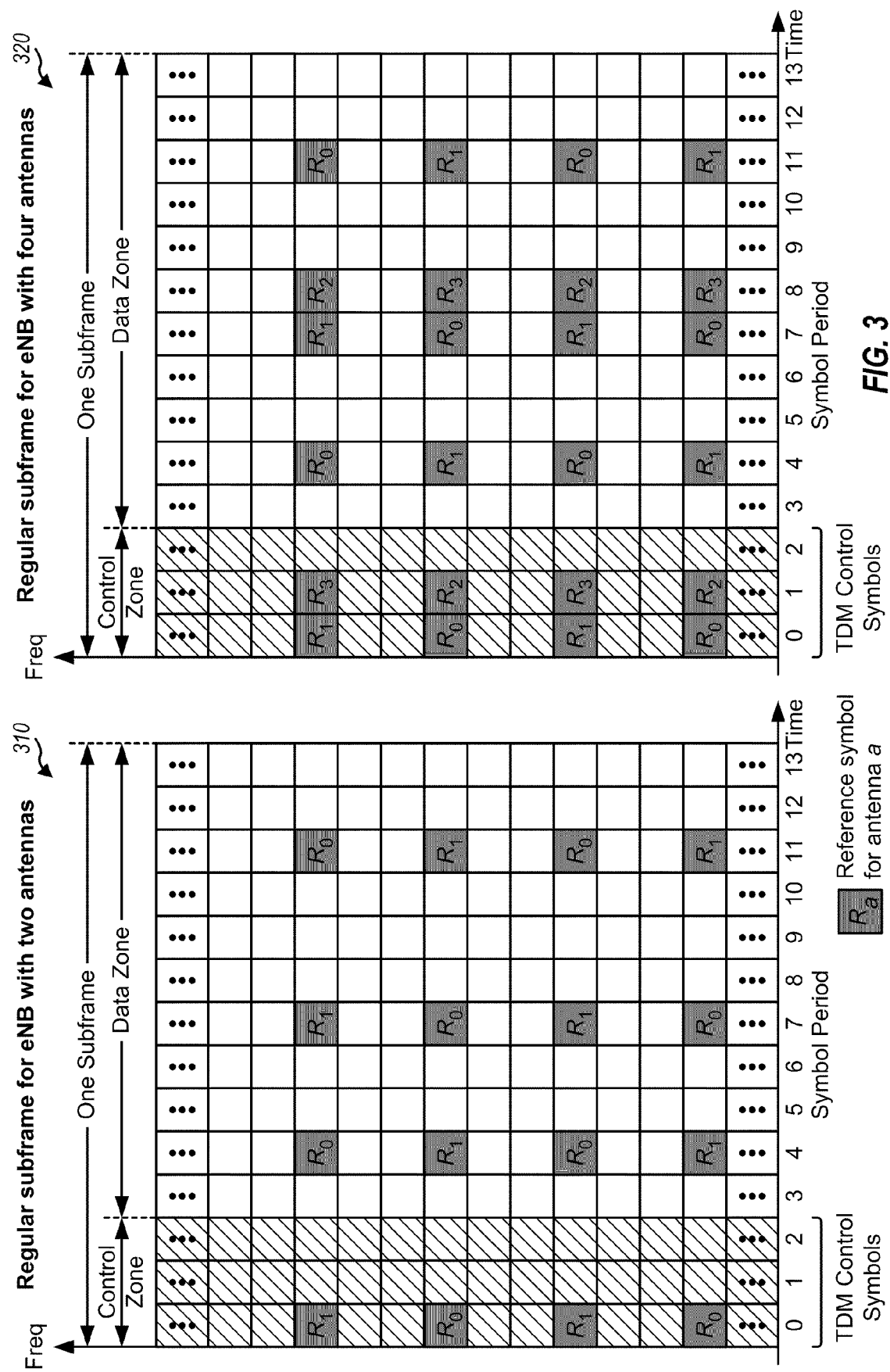
FIG. 3 shows two exemplary regular subframe formats.

FIG. 3 shows two exemplary regular subframe formats 310 and 320 for the downlink for the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

As shown in FIG. 3, a subframe may include a control zone followed by a data zone. The control zone may include the first M OFDM symbols of the subframe, where M may be equal to 1, 2, 3 or 4. M may change from subframe to subframe and may be conveyed by a Physical Control Format Indicator Channel (PCFICH) that is sent in the first symbol period of the subframe. The first M OFDM symbols may be TDM control symbols, which are OFDM symbols carrying control information. The data zone may include the remaining 2L-M symbol periods of the subframe and may carry data for UEs. In the example shown in FIG. 3, each subframe includes three TDM control symbols with M=3. Control information may be sent in symbol periods 0 to 2, and data may be sent in the remaining symbol periods 3 to 13 of the subframe.

Subframe format 310 may be used by an eNB equipped with two antennas. A cell-specific reference signal (CSRS) may be sent in symbol periods 0, 4, 7 and 11 and may be used by UEs for channel estimation and other measurements. A reference signal is a signal that is known a priori by a transmitter and a receiver and may also be referred to as pilot. A cell-specific reference signal is a reference signal that is specific for a cell, e.g., generated with one or more symbol sequences determined based on a cell identity (ID). In FIG. 3, for a given resource element with label $R_a$, a reference symbol may be sent on that resource element from antenna a, and no modulation symbols may be sent on that resource element from other antennas. Subframe format 320 may be used by an eNB equipped with four antennas. A cell-specific reference signal may be sent in symbol periods 0, 1, 4, 7, 8 and 11. For both subframe formats 310 and 320, resource elements not used for the cell-specific reference signal (shown without shading in FIG. 3) in the data zone may be used to send data.

Figure 4:
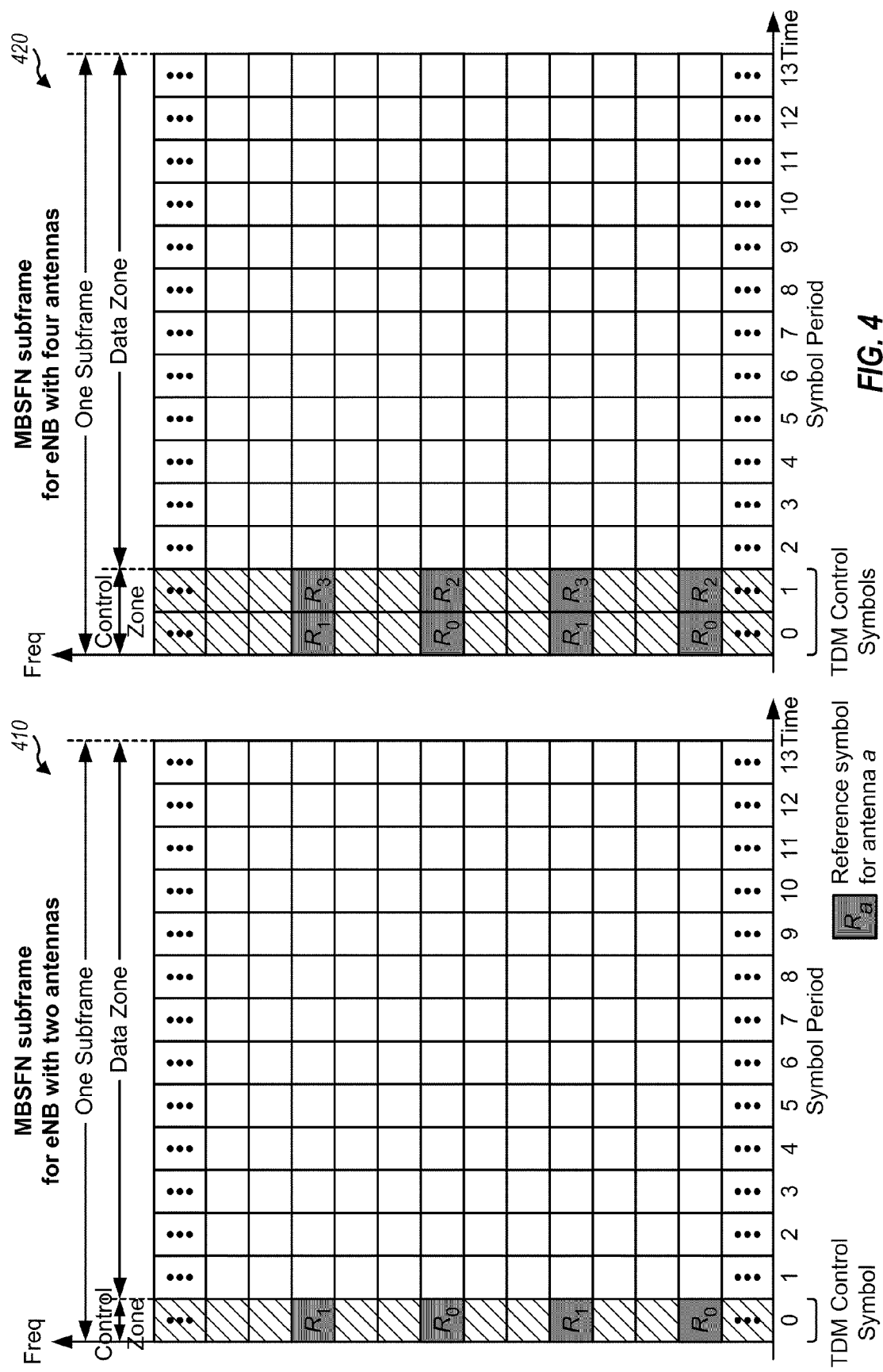
FIG. 4 shows two exemplary MBSFN subframe formats.

FIG. 4 shows two exemplary MBSFN subframe formats 410 and 420 for the downlink for the normal cyclic prefix. Subframe format 410 may be used by an eNB equipped with two antennas. A cell-specific reference signal may be sent in symbol period 0. For the example shown in FIG. 4, M=1 and one TDM control symbol is sent in the control zone of the MBSFN subframe. Subframe format 420 may be used by an eNB equipped with four antennas. A cell-specific reference signal may be sent in symbol periods 0 and 1. For the example shown in FIG. 4, M=2 and two TDM control symbols are sent in the control zone of the MBSFN subframe. For both subframe formats 410 and 420, the entire data zone may be used to send data and possibly reference signal.

Network 100 may support CoMP transmission. For CoMP transmission, multiple cells may simultaneously send one or more data streams to one or more UEs on the same time-frequency resources based on short-term channel feedback from at least one UE to at least two cells. CoMP transmission can achieve this by exploiting additional spatial dimensionality provided by multiple transmit antennas for the multiple cells and multiple receive antennas at the UE. The short-term channel feedback may comprise channel gain estimates and may be used by the multiple cells to spatially process the one or more data streams prior to transmission. CoMP transmission is different from soft handoff and softer handoff in which multiple cells send data to only one UE, without exploiting spatial dimensionality. CoMP transmission may thus improve throughput for the UE and may also provide other advantages.

Figure 5:
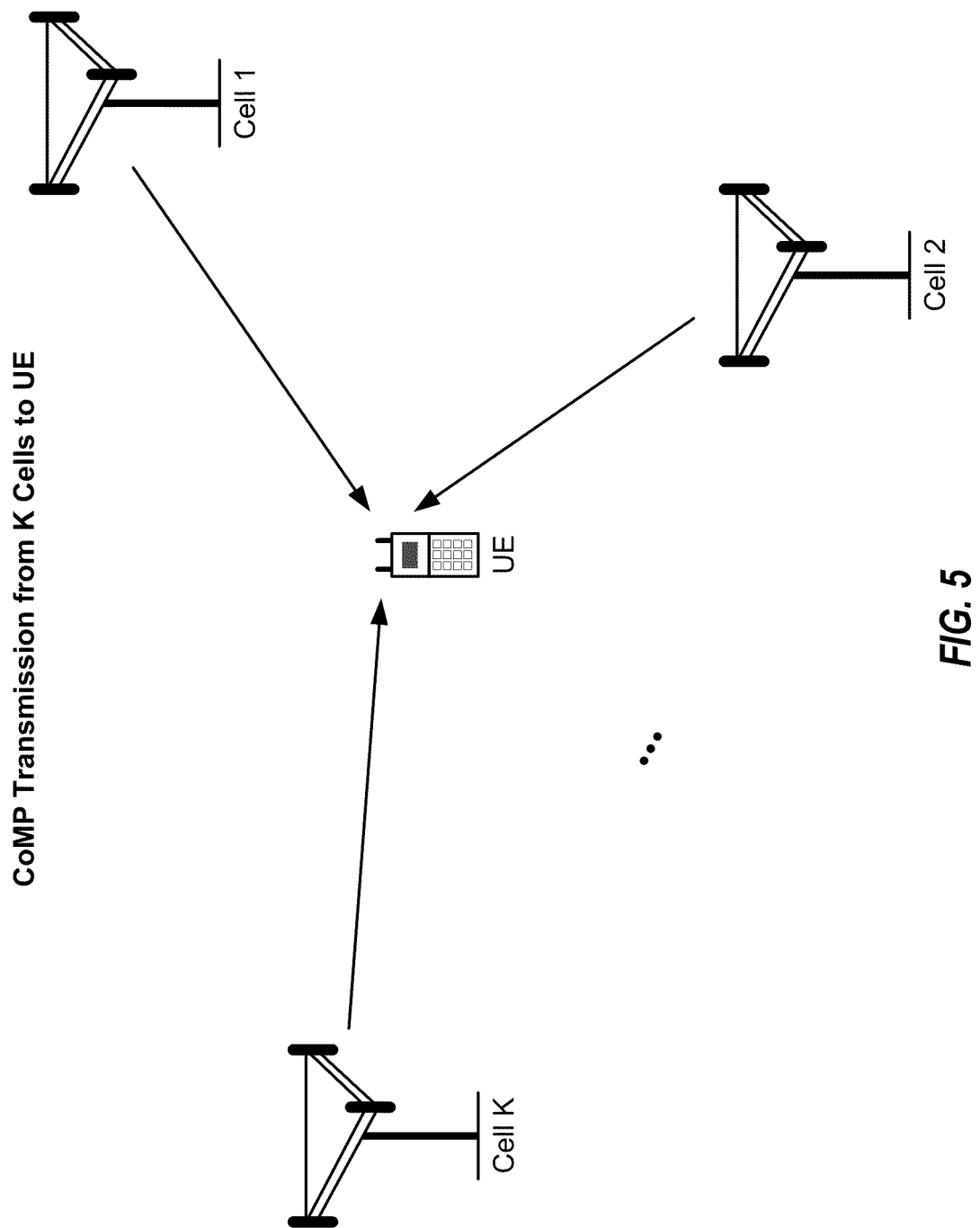
FIG. 5 shows CoMP transmission from multiple cells to a single UE.

FIG. 5 shows an example of CoMP transmission from multiple (K) cells to a single UE. The K cells may belong to the same eNB or different eNBs. The K cells may send data to the UE using either joint processing or cooperative beamforming For joint processing, the K cells may simultaneously send different data streams to one or more UEs, and each UE may perform receiver processing/detection to recover the data stream(s) transmitted to that UE. For coordinated beamforming, the K cells may select beam directions and power density such that data transmission is steered toward the target UE and away from other UEs. This beamforming may reduce interference to other UEs. For both joint processing and cooperative beamforming, the K cells should transmit data on the same resource elements to the UE. These resource elements should not be used by any of the K cells for reference signal or control information.

To support CoMP transmission, the K cells may allocate the same resource blocks to the UE. However, even though the same resource blocks are allocated by the K cells for the UE, the size of the data zone and the reference signal locations may be different for different cells. Thus, there may be a disparity in the resource elements that can be used by the K cells to send data to the UE.

As shown in FIG. 3, each cell may transmit a configurable number of TDM control symbols, which may change from subframe to subframe. Furthermore, each cell may transmit its cell-specific reference signal on a set of resource elements that may be dependent on its cell ID. A subcarrier offset for a transmit antenna for a cell may be given as follows:

$$v_{shift} = N_{ID}^{cell} \bmod 6 \quad \text{Eq (1)}$$

where $N_{ID}^{cell}$ denotes a cell ID, $v_{shift}$ denotes the subcarrier offset, and "mod" denotes a modulo operation. For a case of two transmit antennas, the subcarriers used for a reference signal from transmit antenna 0 may be offset by three subcarriers from the subcarriers used for a reference signal from transmit antenna 1. In this case, the set of subcarriers used for the reference signals from both transmit antennas 0 and 1 for a given cell may be given as $v_{shift} = N_{ID}^{cell} \bmod 3$.

Each cell may transmit a cell-specific reference signal on a set of resource elements that may be determined based on the subcarrier offset for the cell. Cells with cell IDs that map to the same subcarrier offset may transmit their cell-specific reference signals on the same set of resource elements. Conversely, cells with cell IDs that map to different subcarrier offsets may transmit their cell-specific reference signals on different sets of resource elements. FIG. 3 shows one set of resource elements (represented by boxes with shading) for one subcarrier offset for each of subframe formats 310 and 320. For each subframe format, five other sets of resource elements for cell-specific reference signal may be formed by shifting the set of resource elements shown in FIG. 3 in frequency by a different number of subcarriers.

Dynamic signaling may be used to address the possible disparity in the resource elements that can be used by the K cells to send data to the UE. For dynamic signaling, each cell may dynamically send control information in each subframe used for CoMP transmission to the UE. The control information from each cell may be used by the UE to determine which resource elements can be used by that cell to send data to the UE. The UE may determine the set of resource elements available to all K cells to send data to the UE. This set of resource elements may exclude resource elements in the control zone of each cell as well as resource elements used for the cell-specific reference signal by each cell. The UE may then receive CoMP transmission from the K cells on this set of resource elements. On the network side, each cell may dynamically receive (e.g., via the backhaul) control information that may be used by that cell to determine which resource elements can be used by the other cells to send data to the UE. Each cell may then determine the set of resource elements available to all K cells to send data to the UE. Each cell may then send data to the UE on this set of resource elements.

The dynamic signaling scheme described above may ensure that the K cells send data on the same resource elements that are available to all cells. The scheme may also ensure that the UE can ascertain these resource elements and receive data from the proper resource elements. However, the dynamic signaling may increase overhead and complexity for CoMP transmission.

In an aspect, a semi-static configuration may be used by a set of cells for CoMP transmission to a UE. The semi-static configuration may indicate resource elements that are available to all cells in the set to send data to the UE. These resource elements may be referred to as available resource elements. The semi-static configuration may change infrequently, if at all, and may thus reduce overhead and complexity for CoMP transmission in comparison to the dynamic signaling scheme described above.

The semi-static configuration may be determined for the set of cells that can transmit data to the UE for CoMP transmission, i.e., cells that can participate in CoMP transmission to the UE. This set of cells may be referred to as a candidate serving set for the UE. One cell in the candidate serving set may be designated as a serving/anchor cell for the UE. The serving cell may be the cell designated to send signaling to and receive signaling from the UE. The candidate serving set may include cells determined based on long-term channel strength between the cells and the UE and may thus be a semi-static set that may change slowly. All or a subset of the cells in the candidate serving set may send data to the UE in any given subframe. Each cell may send data on the available resource elements to the UE regardless of the actual resource elements that can be used by that cell to send data to the UE. The available resource elements may thus be a subset of all resource elements that can be used by each cell to send data to the UE.

In another aspect, the cells in the candidate serving set may coordinate to configure a maximum number of TDM control symbols that these cells will send. This may ensure that the cells will use the same number of TDM control symbols at most. The maximum number of TDM control symbols for the candidate serving set may be denoted as $N_{MAX}$. $N_{MAX}$ may correspond to the maximum size of the control zone and may be determined in various manners.

In one design, $N_{MAX}$ may be negotiated by the cells in the candidate serving set, e.g., via backhaul messages. Each cell may send a message to indicate or request a particular maximum number of TDM control symbols for that cell. The maximum control zone of each cell in the candidate serving set may be selected conservatively in order to avoid frequent updates via the backhaul. $N_{MAX}$ for the candidate serving set may then be selected based on the requested maximum numbers of TDM control symbols from all cells in the candidate serving set. In one design, $N_{MAX}$ may be equal to the largest requested maximum number of TDM control symbols from all cells in the candidate serving set. In another design, $N_{MAX}$ may be selected based on the requested maximum numbers of TDM control symbols from all cells and possibly other considerations. For this design, $N_{MAX}$ may or may not be equal to the largest requested maximum number of TDM control symbols.

In another design, $N_{MAX}$ may be determined by a designated network entity, which may be the serving cell, network controller 130 in FIG. 1, or some other entity. The designated network entity may be responsible for controlling the operation of the cells in the candidate serving set for CoMP transmission. In yet another design, $N_{MAX}$ may be set by a network operator.

For all designs, the UE may be informed of $N_{MAX}$ for the candidate serving set. The UE would then know the maximum size of the control zones for all cells in the candidate serving set. $N_{MAX}$ may be considered as the size of a common control zone for all cells in the candidate serving set. All cells in the candidate serving set may send at most $N_{MAX}$ TDM control symbols, even if they request more than $N_{MAX}$ TDM control symbols during negotiation. The UE may also be informed of the cells in the candidate serving set. However, the UE may not need to be informed of the specific cells sending data to the UE in any given subframe. The UE may simply assume that all cells in the candidate serving set will send data to the UE even though only a subset of the cells may actually send data to the UE.

$N_{MAX}$ may be a semi-static value that does not change frequently in order to avoid excessive signaling overhead. $N_{MAX}$ may be fixed for all subframes or may be subframe dependent. For example, a first $N_{MAX}$ value may be used for subframe x in each radio frame, a second $N_{MAX}$ value may be used for subframe y in each radio frame, etc. In any case, the cells in the candidate serving set and the UE may have knowledge of $N_{MAX}$ and can send and receive data accordingly. If $N_{MAX}$ is larger than the control zone of the serving cell, then a non-CoMP data transmission may be sent by the serving cell on resource elements within the first $N_{MAX}$ symbols of a subframe used for CoMP.

In yet another aspect, the cells in the candidate serving set may send their cell-specific reference signals on the same set of resource elements. Aligning the cell-specific reference signals from the cells in the candidate serving set may minimize the number of resource elements used for the cell-specific reference signal. This may then maximize the number of resource elements available to send data to the UE, which may be desirable. Alignment of the cell-specific reference signals may be achieved by having the cells in the candidate serving set be assigned cell IDs that map to the same subcarrier offset, as shown in equation (1). Since cells are typically assigned static cell IDs, a fixed clustering scheme may be used, and clusters of cells for CoMP transmission may be predefined based on their static cell IDs. Each cluster may include cells with cell IDs that map to the same subcarrier offset. The candidate serving set for the UE may be one of the possible clusters of cells.

The UE may obtain the cell IDs of the cells in the candidate serving set, e.g., via primary and secondary synchronization signals sent by these cells. The UE may be able to determine the resource elements used by these cells for the cell-specific reference signals based on their cell IDs. If the cell-specific reference signals of the cells in the candidate serving set are not aligned, then the UE may ascertain the set of resource elements used for the cell-specific reference signals by these cells. The UEs may mark these resource elements as unavailable for CoMP transmission from the cells in the candidate serving set.

In yet another aspect, the cells in the candidate serving set may send UE-specific reference signals on a single set of resource elements to the UE. A cell-specific reference signal may be received by all UEs and may be referred to as a common reference signal or pilot. A UE-specific reference signal may be intended for a specific UE and may also be referred to as a dedicated reference signal or pilot. The cells may send the UE-specific reference signals in the same manner as data, e.g., with beamforming, if it is applied to data. This may simplify channel estimation by the UE for CoMP transmission. In one design, all cells in the wireless network may send their UE-specific reference signals on the same set of resource elements. Different clusters of cells may be assigned different scrambling codes for different UEs, and the cells in each cluster may scramble their UE-specific reference signals for a given UE with the scrambling code assigned to that cluster for the UE. The UE-specific reference signals from different clusters of cells may be distinguished by the use of different scrambling codes.

In one design, the cells in the candidate serving set may send both UE-specific reference signals and cell-specific reference signals. The cells may send the cell-specific reference signals from two or four antennas, e.g., using the regular subframe format shown in FIG. 3. The cells may also send the cell-specific reference signals from two antennas, even when four antennas are present, in order to reduce reference overhead. The cells may send the UE-specific reference signals using antenna port 5, which may be mapped to a set of resource elements not shown in FIG. 3. In another design, the cells may send only UE-specific reference signals and no cell-specific reference signals, e.g., using the MBSFN subframe format shown in FIG. 4. The UE-specific reference signals may be sent on a set of resource elements that is known a priori by the cells and the UE.

In yet another aspect, the cells in the candidate serving set may send CoMP transmission to the UE on only the available resource elements in a resource block. The available resource elements may be resource elements that are not included in the common control zone and are not used for cell-specific reference signals by the cells in the candidate serving set. The CoMP transmission may include data for the UE and may or may not include UE-specific reference signals. The UE-specific reference signals, if sent, may be used by the UE for channel estimation and interference estimation for the resource elements used for the CoMP transmission.

The cells may send a non-CoMP transmission on all or some of the remaining resource elements in the resource block. For the non-CoMP transmission, the UE may perform channel estimation and interference estimation based on the cell-specific reference signals from the cells. Decoding both the CoMP and non-CoMP transmissions in the same resource block may increase complexity of the UE. A UE capability parameter may be used to indicate whether the UE is capable of decoding both the CoMP and non-CoMP transmissions. The UE may send this UE capability parameter to the serving cell, which may forward the information to the other cells in the candidate serving set. The cells may use this parameter to determine whether to send both CoMP and non-CoMP transmissions to the UE. The cells may also use this parameter to select a modulation and coding scheme (MCS) for the UE.

In yet another aspect, CoMP transmission may be sent in subframes and/or carriers in which legacy UEs are not scheduled for data transmission on the downlink. Legacy UEs may be UEs that expect to receive cell-specific reference signals and/or TDM control symbols from the cells. By restricting CoMP transmission to subframes and/or carriers in which legacy UEs are not scheduled, the cell-specific reference signals and/or the TDM control symbols may be omitted, which may then increase the number of resource elements available for CoMP transmission.

CoMP transmission may be sent in different types of subframes. In one design, CoMP transmission may be sent in regular subframes, e.g., as shown in FIG. 3. The control zone size and the resource elements for cell-specific reference signals may be configured as described above. In another design, CoMP transmission may be sent in MBSFN subframes, e.g., as shown in FIG. 4. Each MBSFN subframe may include few (e.g., one or two) TDM control symbols and may include cell-specific reference signals in only the control zone. The entire data zone may be used for CoMP transmission. The cells in the candidate serving set may send data and UE-specific reference signals (instead of cell-specific reference signals) in the data zone for CoMP transmission. In another design, CoMP transmission may be sent in blank subframes, which are subframes with no TDM control symbols and no cell-specific reference signals. An entire resource block in a blank subframe may thus be used for CoMP transmission. The cells in the candidate serving set may send data and UE-specific reference signals for CoMP transmission in the entire resource block.

In one design, CoMP transmission may be sent on a carrier that may be used for legacy UEs. In this case, signaling may be sent to identify MBSFN subframes and/or blank subframes, if any, on the carrier. In another design, CoMP transmission may be sent on a carrier that is not used for legacy UEs, which may be referred to as a non-legacy carrier. In this case, signaling to identify different type of subframes may be omitted. A non-legacy carrier may have a reduced set of reference signals (which may include no common references signals) and/or a different type of signaling (which may yield no control zone or a small control zone, thereby reducing the amount of signaling overhead).

In one design, information indicative of the semi-static configuration for CoMP transmission may be sent to the UE on either a physical downlink shared channel (PDSCH) or a physical downlink control channel (PDCCH). The semi-static configuration may comprise the maximum number of TDM control symbols and the cell IDs for the cells in the candidate serving set. The PDSCH is sent in the data zone and normally carries data for UEs. The PDCCH is sent in the control zone and normally carries control information for UEs. In one design, only the subcarrier offset $v_{shift}$ for each cell may be signaled instead of the cell ID in order to reduce overhead. In one design, a 2-bit bitmap of subcarrier offsets (excluding the subcarrier offset of the serving cell) may be used for this indication. Similarly, only the maximum number of TDM control symbols (or the difference between the maximum number of TDM control symbols and the number of TDM control symbols for the serving cell) may be signaled to the UE using a 2-bit quantity. Alternatively, the maximum number of TDM control symbols and the subcarrier offsets may be jointly coded and signaled.

In another design, information indicative of the semi-static configuration may be signaled to the UE via Layer 3 (L3) signaling. The information may indicate the maximum number of TDM control symbols, the cell IDs of the cells in the candidate serving set, the number of antennas for each cell, etc.

Signaling may also be sent dynamically (e.g., on the PDCCH) to inform the UE of the specific cells transmitting data to the UE in a given subframe. These cells may be indicated by a bitmap or some other format. This signaling may also be omitted.

The techniques described herein may provide various advantages for CoMP transmission. First, the techniques may avoid the need to dynamically inform the UE of the instantaneous configuration of the control zone for each cell in the candidate serving set. Second, the techniques may avoid the need to inform the UE of which specific cells will transmit to the UE in a given subframe. This may reduce overhead and complexity for CoMP transmission.

FIG. 6 shows a design of a process 600 for sending CoMP transmission. Process 600 may be performed by a cell (as described below) or by some other entity. The cell may determine a semi-static configuration comprising resource elements (or time-frequency resources) available to a set of cells to send CoMP transmission to a UE (block 612). The semi-static configuration may also comprise other information such as the specific cells in the set, the number of antennas for each cell, the subcarrier offset for each cell, etc. The semi-static configuration may be valid for a plurality of subframes in which the CoMP transmission is sent. The cell may send information indicative of the semi-static configuration to the UE (block 614). Block 614 may be performed by only a serving/anchor cell and not by the other cells in the set.

In one design, a maximum number of TDM control symbols for all cells in the set may be determined, e.g., based on a requested maximum number of TDM control symbols from each cell in the set. Resource elements used for cell-specific reference signals by the cells in the set may also be determined. The available resource elements may then be determined based on the maximum number of TDM control symbols and the resource elements used for the cell-specific reference signals. The available resource elements may exclude the resource elements used for the TDM control symbols and the cell-specific reference signals. The available resource elements may also be determined in other manners.

The cell may send data on the available resource elements to the UE for the CoMP transmission (block 616). The cell may also send up to the maximum number of TDM control symbols in each subframe in which the CoMP transmission is sent (block 618). In one design, the cell may send a cell-specific reference signal multiplexed with the data for the CoMP transmission (block 620). The cells in the set may transmit their cell-specific reference signals aligned in time and frequency on a single set of resource elements. Alternatively or additionally, the cell may send a UE-specific reference signal for the CoMP transmission. The cell may scramble the UE-specific reference signal based on a scrambling code assigned to the set of cells for the UE. The cells in the set may transmit their UE-specific reference signals aligned in time and frequency on a single set of resource elements to the UE.

In one design, the cells in the set may be assigned cell IDs that map to a single set of resource elements for the cell-specific reference signals. This may reduce overhead for the cell-specific reference signals and may result in more available resource elements for the CoMP transmission. In one design, a plurality of sets of cells may be predefined, with each set including cells with cell IDs that map to a single set of resource elements for the cell-specific reference signals. The set of cells for the UE may be one of the plurality of sets of cells.

In yet another design, the cell-specific reference signals of a large group of cells in the network may overlap. The resource elements used for a cell-specific reference signal from a given cell may be determined based on a cell-specific reference signal ID (CSRS ID). This CSRS ID may be set to the cell ID of each cell to achieve reuse as described in LTE Release 8. Alternatively, this CSRS ID may be set to a designated value, which may be common for a large group of cells in a large portion of the network or the entire network, so that the same resource elements are used for the cell-specific reference signals from the cells in the large group. This design may be considered as an extension of the cluster-specific reference signal location described above across all or a large portion of the network. This design may be especially applicable for non-legacy carriers.

In one design, the cell may send the data on the available resource elements in a regular subframe to the UE for the CoMP transmission. In another design, the cell may send the data on the available resource elements in a data zone of an MBSFN subframe, which may include no cell-specific reference signals in the data zone, e.g., as shown in FIG. 4. In yet another design, the cell may send the data on the available resource elements in a blank subframe, which may include no cell-specific reference signals and no control information for other UEs. The cell may also send the data on the available resource elements in subframes of other formats/types.

FIG. 7 shows a design of an apparatus 700 for sending CoMP transmission. Apparatus 700 includes a module 712 to determine a semi-static configuration comprising resource elements available to a set of cells to send CoMP transmission to a UE, a module 714 to send information indicative of the semi-static configuration to the UE, a module 716 to send data on the available resource elements to the UE for the CoMP transmission, a module 718 to send up to a maximum number of TDM control symbols in each subframe in which the CoMP transmission is sent, and a module 720 to send a cell-specific reference signal and/or a UE-specific reference signal multiplexed with the data for the CoMP transmission.

FIG. 8 shows a design of a process 800 for receiving CoMP transmission. Process 800 may be performed by a UE (as described below) or by some other entity. The UE may receive information indicative of a semi-static configuration comprising resource elements available to a set of cells to send CoMP transmission to the UE (block 812). The available resource elements may be determined based on (i) a maximum number of TDM control symbols for all cells in the set, (ii) resource elements used for cell-specific reference signals by the cells in the set, and/or (iii) other information.

The UE may receive data sent on the available resource elements by at least two cells in the set of cells to the UE for the CoMP transmission (block 814). The at least two cells may be all or some of the cells in the set. The UE may receive the data in a regular subframe, an MBSFN subframe, a blank subframe, or a subframe of some other type/format. In one design, the UE may receive cell-specific reference signals sent aligned in time and frequency by the at least two cells (block 816). In another design, the UE may receive UE-specific reference signals sent aligned in time and frequency by the at least two cells for the CoMP transmission (also block 816). The UE may perform detection for the received data based on the cell-specific and/or UE-specific reference signals (block 818).

FIG. 9 shows a design of an apparatus 900 for receiving CoMP transmission. Apparatus 900 includes a module 912 to receive information indicative of a semi-static configuration comprising resource elements available to a set of cells to send CoMP transmission to a UE, a module 914 to receive data sent on the available resource elements by at least two cells in the set of cells to the UE for the CoMP transmission, a module 916 to receive cell-specific reference signals and/or UE-specific reference signals sent aligned in time and frequency by the at least two cells, and a module 918 to perform detection for the received data based on the cell-specific and/or UE-specific reference signals.

FIG. 10 shows a design of a process 1000 for sending CoMP transmission. Process 1000 may be performed by a cell (as described below) or by some other entity. The cell may determine an MBSFN subframe used by a set of cells for CoMP transmission to a UE (block 1012). The cell may send data in a data zone of the MBSFN subframe to the UE for the CoMP transmission (block 1014). The MBSFN subframe may include no cell-specific reference signals and no data for other UEs in the data zone. The cell may send a UE-specific reference signal in the data zone for the CoMP transmission (block 1016).

FIG. 11 shows a design of an apparatus 1100 for sending CoMP transmission. Apparatus 1100 includes a module 1112 to determine an MBSFN subframe used by a set of cells for CoMP transmission to a UE, a module 1114 to send data in a data zone of the MBSFN subframe to the UE for the CoMP transmission, and a module 1116 to send a UE-specific reference signal in the data zone for the CoMP transmission.

Figure 12:
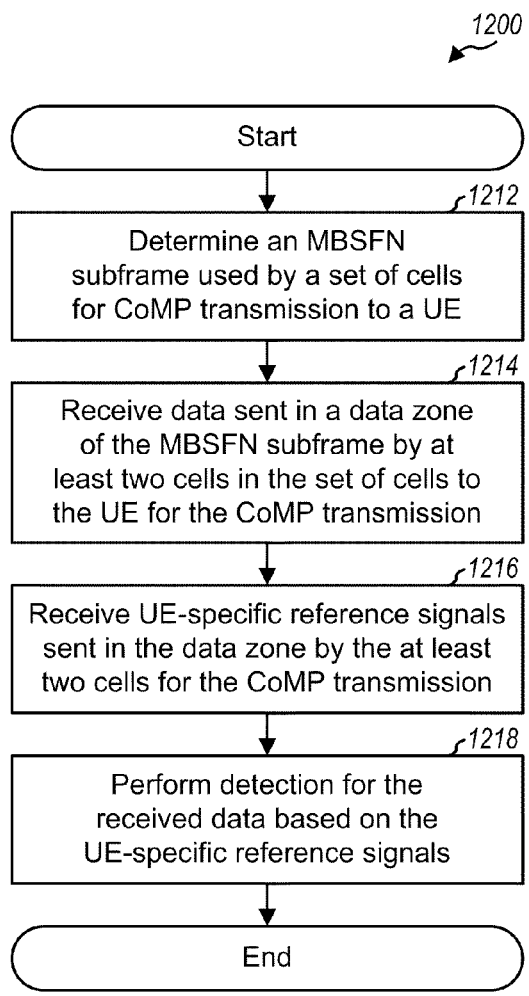
FIGS. 12 and 13 show a process and an apparatus, respectively, for receiving CoMP transmission sent in an MBSFN subframe.

FIG. 12 shows a design of a process 1200 for receiving CoMP transmission. Process 1200 may be performed by a UE (as described below) or by some other entity. The UE may determine an MBSFN subframe used by a set of cells for CoMP transmission to the UE (block 1212). The UE may receive data sent in a data zone of the MBSFN subframe by at least two cells in the set of cells to the UE for the CoMP transmission (block 1214). The UE may receive UE-specific reference signals sent in the data zone by the at least two cells for the CoMP transmission (block 1216). The UE may perform detection for the received data based on the UE-specific reference signals (block 1218).

Figure 13:
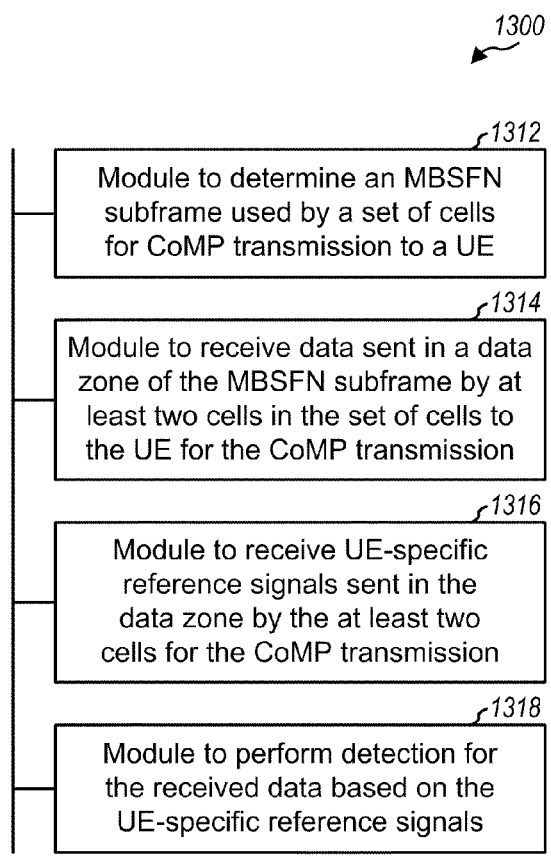

FIG. 13 shows a design of an apparatus 1300 for receiving CoMP transmission. Apparatus 1300 includes a module 1312 to determine an MBSFN subframe used by a set of cells for CoMP transmission to a UE, a module 1314 to receive data sent in a data zone of the MBSFN subframe by at least two cells in the set of cells to the UE for the CoMP transmission, a module 1316 to receive UE-specific reference signals sent in the data zone by the at least two cells for the CoMP transmission, and a module 1318 to perform detection for the received data based on the UE-specific reference signals.

The modules in FIGS. 7, 9, 11 and 13 may comprise processors, electronic devices, hardware devices, electronic components, logical circuits, memories, software codes, firmware codes, etc., or any combination thereof.

Figure 14:
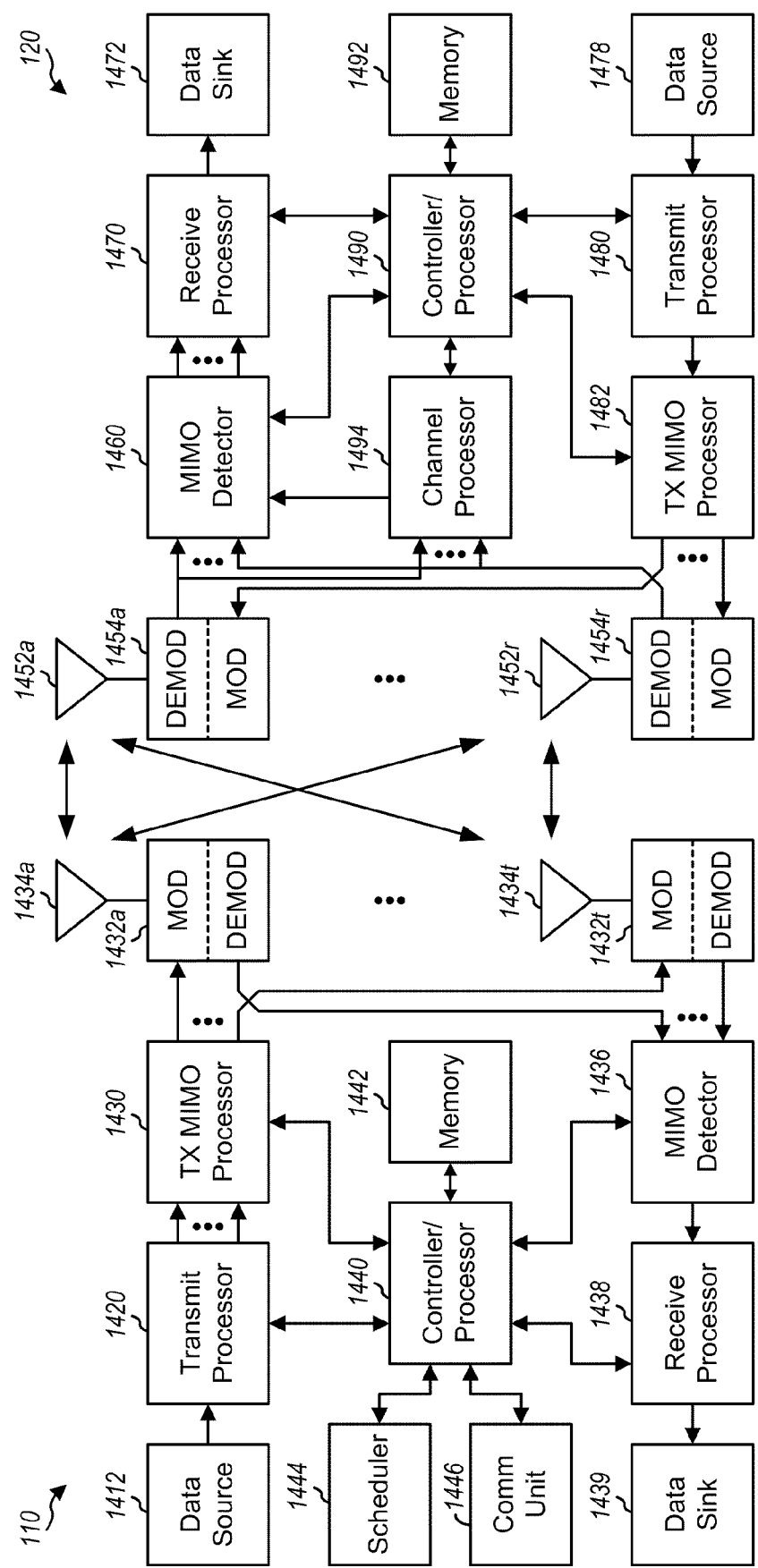
FIG. 14 shows a block diagram of a base station and a UE.

FIG. 14 shows a block diagram of a design of a base station/eNB 110 and a UE 120, which may be one of the base stations/eNBs and one of the UEs in FIG. 1. Base station 110 may be equipped with T antennas 1434a through 1434t, and UE 120 may be equipped with R antennas 1452a through 1452r, where in general T≥1 and R≥1. Base station 110 may serve one or more cells.

At base station 110, a transmit processor 1420 may receive data for one or more UEs from a data source 1412, process (e.g., encode and modulate) the data for each UE based on one or more modulation and coding schemes, and provide data symbols for all UEs. Transmit processor 1420 may also receive control information (e.g., for a semi-static configuration for CoMP transmission to UE 110) from a controller/processor 1440, process the control information, and provide control symbols. Transmit processor 1420 may also generate reference symbols for a cell-specific reference signal for each cell served by base station 110 and/or a UE-specific reference signal for each UE with CoMP transmission. A transmit (TX) multiple-input multiple-output (MIMO) processor 1430 may perform spatial processing (e.g., precoding or beamforming) on the data symbols, the control symbols, and/or the reference symbols, if applicable, and may provide T output symbol streams to T modulators (MOD) 1432*a* through 1432*t*. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink signal. T downlink signals from modulators 1432*a* through 1432*t* may be transmitted via T antennas 1434*a* through 1434*t*, respectively.

At UE 120, R antennas 1452*a* through 1452*r* may receive the downlink signals from base station 110 and possibly other base stations and may provide received signals to demodulators (DEMOD) 1454*a* through 1454*r*, respectively. Each demodulator 1454 may condition (e.g., filter, amplify, downconvert, and digitize) its received signal to obtain received samples and may further process the received samples (e.g., for OFDM, etc.) to obtain received symbols. A channel processor 1494 may perform channel estimation and interference estimation based on the cell-specific and/or UE-specific reference signals from all cells transmitting to UE 120. A MIMO detector 1460 may perform MIMO detection (if applicable) on the received symbols from all R demodulators 1454*a* through 1454*r* based on a channel estimate from channel processor 1494 and may provide detected symbols. A receive processor 1470 may process (e.g., demodulate and decode) the detected symbols, provide decoded data for UE 120 to a data sink 1472, and provide decoded control information to a controller/processor 1490.

On the uplink, at UE 120, data from a data source 1478 and control information from controller/processor 1490 may be processed by a transmit processor 1480, precoded by a TX MIMO processor 1482 (if applicable), conditioned by modulators 1454*a* through 1454*r*, and transmitted via antennas 1452*a* through 1452*r*. At base station 110, the uplink signals from UE 120 and other UEs may be received by antennas 1434, conditioned by demodulators 1432, detected by a MIMO detector 1436, and processed by a receive processor 1438 to obtain the data and control information transmitted by UE 120 and other UEs.

Controllers/processors 1440 and 1490 may direct the operation at base station 110 and UE 120, respectively. Processor 1440 and/or other processors and modules at base station 110 may perform or direct process 600 in FIG. 6, process 1000 in FIG. 10, and/or other processes for the techniques described herein. Processor 1490 and/or other processors and modules at UE 120 may perform or direct process 800 in FIG. 8, process 1200 in FIG. 12, and/or other processes for the techniques described herein. Memories 1442 and 1492 may store data and program codes for base station 110 and UE 120, respectively. A scheduler 1444 may schedule UEs for transmission on the downlink and/or uplink and may assign resources to the scheduled UEs. For example, scheduler 1444 may schedule CoMP transmission for UE 110, determine a candidate serving set for the CoMP transmission, and assign resource blocks for the CoMP transmission. A communication (Comm) unit 1446 may support communication with other base stations and network controller 130 via the backhaul.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a semi-static configuration comprising resource elements available to a set of cells to send a Coordinated MultiPoint (CoMP) transmission to a user equipment (UE), wherein the available resource elements are determined based on a maximum number of time division multiplexed (TDM) control symbols determined for all cells in the set; and
   sending data on the available resource elements to the UE for the CoMP transmission.

2. The method of claim 1, further comprising:
   sending information indicative of the semi-static configuration to the UE, wherein the semi-static configuration is valid for a plurality of subframes in which the CoMP transmission is sent.

3. The method of claim 1, wherein the maximum number of TDM control symbols for all cells in the set is determined based on a requested maximum number of TDM control symbols from each cell in the set.

4. The method of claim 1, further comprising:
   sending up to the maximum number of TDM control symbols in each subframe in which the CoMP transmission is sent.

5. The method of claim 1, wherein the determining the semi-static configuration further comprises
   determining resource elements used for cell-specific reference signals by the cells in the set, and
   determining the available resource elements based further on the resource elements used for the cell-specific reference signals.

6. The method of claim 1, further comprising:
   sending a cell-specific reference signal multiplexed with the data for the CoMP transmission, wherein the cells in the set transmit cell-specific reference signals aligned in time and frequency on a single set of resource elements.

7. The method of claim 1, wherein the cells in the set are assigned cell identities (IDs) that map to a single set of resource elements for cell-specific reference signals.

8. The method of claim 1, wherein a plurality of sets of cells are predefined, each set including cells with cell identities (IDs) that map to a single set of resource elements for cell-specific reference signals, and wherein the set of cells is one of the plurality of sets of cells.

9. The method of claim 1, wherein the set of cells is among a larger group of cells using a common set of resource elements for cell-specific reference signals.

10. The method of claim 1, further comprising:
    sending a UE-specific reference signal for the CoMP transmission, wherein the cells in the set transmit UE-specific reference signals aligned in time and frequency on a single set of resource elements to the UE.

11. The method of claim 10, further comprising:
    scrambling the UE-specific reference signal based on a scrambling code assigned to the set of cells for the UE.

12. The method of claim 1, wherein the sending data comprises sending the data on the available resource elements in a data zone of a multicast/broadcast single frequency network (MBSFN) subframe to the UE for the CoMP transmission, wherein the MBSFN subframe includes no cell-specific reference signals in the data zone.

13. The method of claim 1, wherein the sending data comprises sending the data on the available resource elements in a blank subframe to the UE for the CoMP transmission, wherein the blank subframe includes no cell-specific reference signals and no control information for other UEs.

14. An apparatus for wireless communication, comprising:
    means for determining a semi-static configuration comprising resource elements available to a set of cells to send Coordinated MultiPoint (CoMP) transmission to a user equipment (UE), wherein the available resource elements are determined based on a maximum number of time division multiplexed (TDM) control symbols determined for all cells in the set; and
    means for sending data on the available resource elements to the UE for the CoMP transmission.

15. The apparatus of claim 14, further comprising:
    means for sending information indicative of the semi-static configuration to the UE, wherein the semi-static configuration is valid for a plurality of subframes in which the CoMP transmission is sent.

16. The apparatus of claim 14, wherein the means for determining the semi-static configuration further comprises
    means for determining resource elements used for cell-specific reference signals by the cells in the set, and
    means for determining the available resource elements based further on the resource elements used for the cell-specific reference signals.

17. The apparatus of claim 14, further comprising:
    means for sending a cell-specific reference signal multiplexed with the data for the CoMP transmission, wherein the cells in the set transmit cell-specific reference signals aligned in time and frequency on a single set of resource elements.

18. The apparatus of claim 14, further comprising:
    means for sending a UE-specific reference signal for the CoMP transmission, wherein the cells in the set transmit UE-specific reference signals aligned in time and frequency on a single set of resource elements to the UE.

19. The apparatus of claim 14, wherein the maximum number of TDM control symbols for all cells in the set is determined based on a requested maximum number of TDM control symbols from each cell in the set.

20. The apparatus of claim 14, wherein the means for sending are operative to send up to the maximum number of TDM control symbols in each subframe in which the CoMP transmission is sent.

21. The apparatus of claim 14, wherein the means for sending data are operative to send the data on the available resource elements in a data zone of a multicast/broadcast single frequency network (MBSFN) subframe to the UE for the CoMP transmission, wherein the MBSFN subframe includes no cell-specific reference signals in the data zone.

22. The method of claim 14, wherein the at least one processor is configured to send the data on the available resource elements in a blank subframe to the UE for the CoMP transmission, wherein the blank subframe includes no cell-specific reference signals and no control information for other UEs.

23. An apparatus for wireless communication, comprising:
at least one processor configured to determine a semi-static configuration comprising resource elements available to a set of cells to send Coordinated MultiPoint (CoMP) transmission to a user equipment (UE), wherein the available resource elements are determined based on a maximum number of time division multiplexed (TDM) control symbols determined for all cells in the set, and to control sending data on the available resource elements to the UE for the CoMP transmission.

24. The apparatus of claim 23, wherein the at least one processor is configured to control sending information indicative of the semi-static configuration to the UE, and wherein the semi-static configuration is valid for a plurality of subframes in which the CoMP transmission is sent.

25. The apparatus of claim 23, wherein the at least one processor is configured to determine resource elements used for cell-specific reference signals by the cells in the set, and to determine the available resource elements based further on the resource elements used for the cell-specific reference signals.

26. The apparatus of claim 23, wherein the at least one processor is configured to control sending a cell-specific reference signal multiplexed with the data for the CoMP transmission, and wherein the cells in the set transmit cell-specific reference signals aligned in time and frequency on a single set of resource elements.

27. The apparatus of claim 23, wherein the at least one processor is configured to control sending a UE-specific reference signal for the CoMP transmission, and wherein the cells in the set transmit UE-specific reference signals aligned in time and frequency on a single set of resource elements to the UE.

28. The apparatus of claim 23, wherein the maximum number of TDM control symbols for all cells in the set is determined based on a requested maximum number of TDM control symbols from each cell in the set.

29. The apparatus of claim 23, wherein the at least one processor is configured to control sending up to the maximum number of TDM control symbols in each subframe in which the CoMP transmission is sent.

30. The apparatus of claim 23, wherein the at least one processor is configured to control sending the data on the available resource elements in a data zone of a multicast/broadcast single frequency network (MBSFN) subframe to the UE for the CoMP transmission, wherein the MBSFN subframe includes no cell-specific reference signals in the data zone.

31. The method of claim 23, wherein the at least one processor is configured to control sending the data on the available resource elements in a blank subframe to the UE for the CoMP transmission, wherein the blank subframe includes no cell-specific reference signals and no control information for other UEs.

32. A computer program product, comprising:
a non-transitory computer-readable medium comprising:
code for causing at least one computer to determine a semi-static configuration comprising resource elements available to a set of cells to send Coordinated MultiPoint (CoMP) transmission to a user equipment (UE), wherein the available resource elements are determined based on a maximum number of time division multiplexed (TDM) control symbols determined for all cells in the set, and
code for causing the at least one computer to control sending data on the available resource elements to the UE for the CoMP transmission.

* * * * *